Patented Oct. 3, 1939

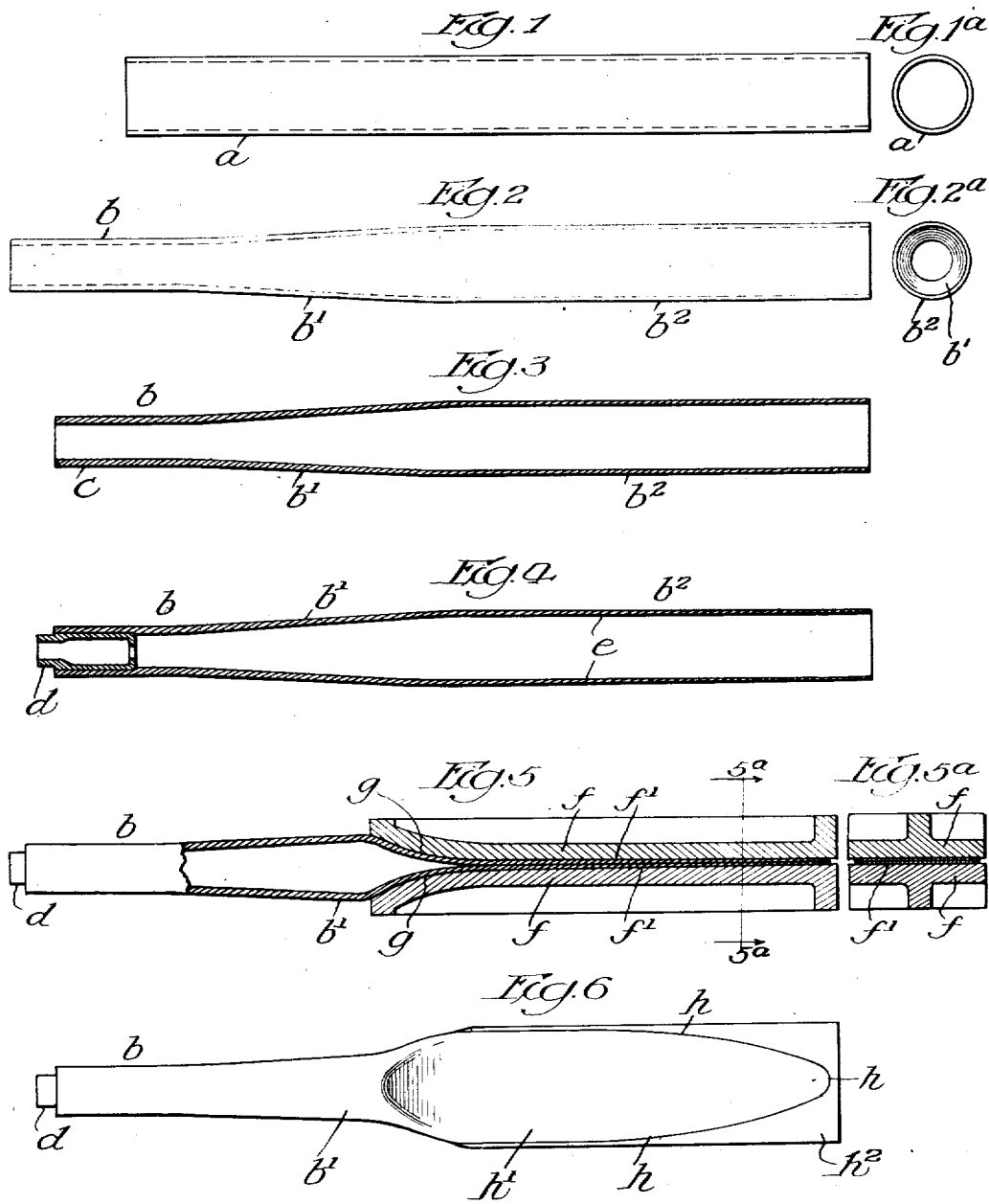

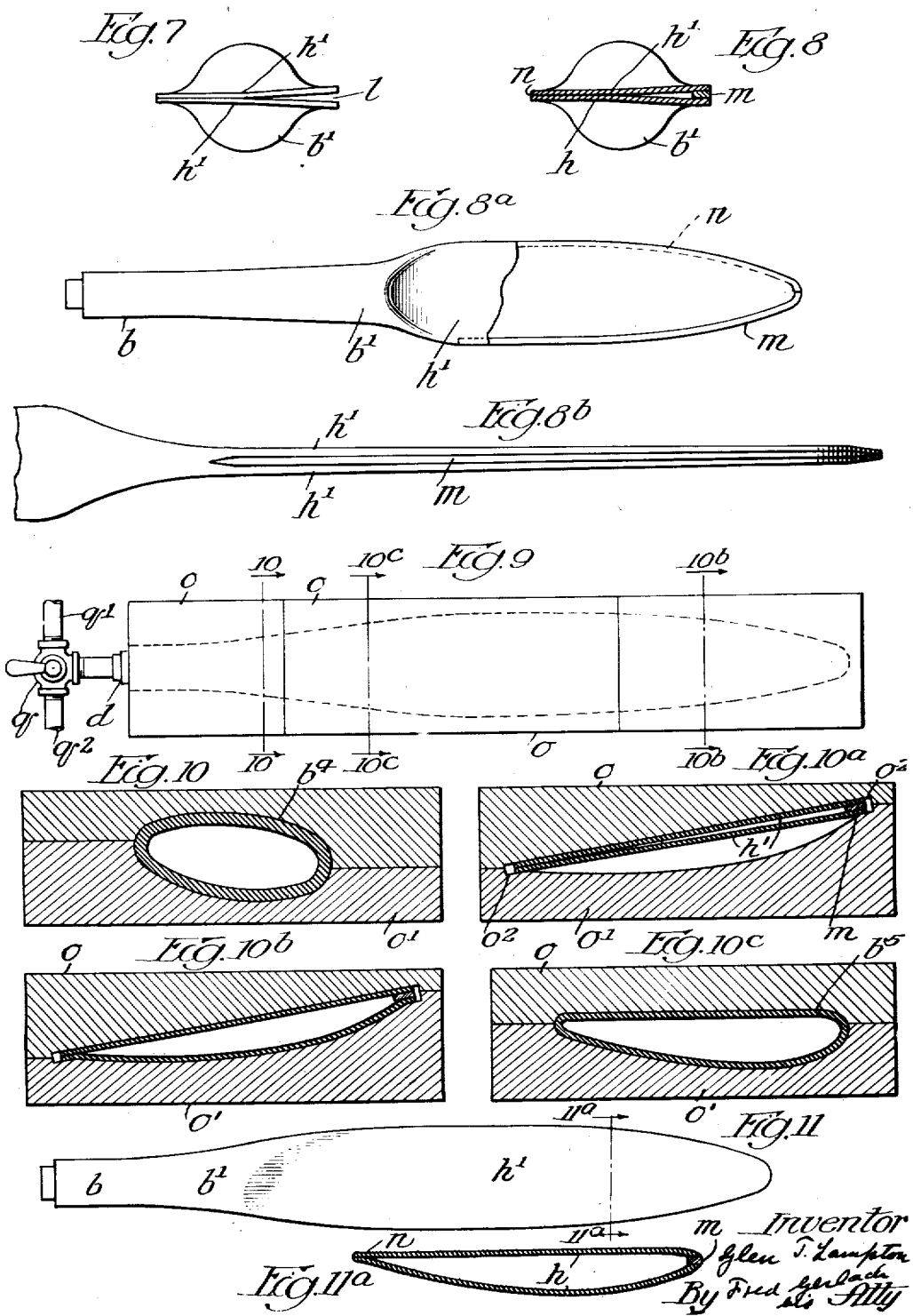

2,174,792

UNITED STATES PATENT OFFICE 2,174,792

MANUFACTURE OF PROPELLERS

Glen T. Lampton, Williamsport, Pa., assignor to Aviation Manufacturing Corporation, Chicago, Ill., a corporation of Delaware Application August 5, 1935, Serial No. 34,669

14 Claims. (Cl. 29—157.5)

The invention relates to the manufacture of hollow metal propeller-blades for aircraft.

Heretofore, it has been proposed to produce such blades from seamless tubing formed to the desired shape and also from two sheets of metal formed in the desired shape and joined along the leading and trailing edges of the blade. In forming the blade from a tube, the bluntness necessary to prevent injurious weakening of the metal along the trailing edge greatly decreases the aerodynamic efficiency of the propeller. On account of that serious disadvantage, this method of manufacture has not been generally adopted.

In forming the blade from two sheets of metal, such as steel, a great amount of welding must be performed and, on account of the curved surfaces involved, costly manual methods must be used. Furthermore, the line of welding, when two sheets are united at their edges, with a single seam above the blade root, commonly crosses the radial stress-lines which exist in the blade, and so place the welds in direct tension, which is undesirable.

The object of the present invention is to overcome these objections to prior methods and to provide an inexpensive method of producing a hollow metal blade and, in the attainment of this object, a blank of tubing is used to avoid welds at the shank and approximately to mid-length of the blade, thus reducing the weld areas on which radial shear stresses are impressed.

Another object of the invention is to provide a method of producing a propeller-blade in which the weld areas of the non-tubular portion of the blade at the leading edge are increased by a strip between the inner faces of the walls. This separate piece of metal increases the area of the weld and places the weld line in oblique relation to the wall thickness and reinforces the leading edge against impact and abrasion resulting from hail, cinders, stones, etc., to which blades are subjected in use.

Another object of the invention is to provide a hollow metal propeller-blade which can be produced at a low cost and is efficient in operation.

The invention consists in the several novel features which are hereinafter set forth and more particularly defined by claims at the conclusion hereof.

In the drawings: Fig. 1 is a side elevation of a tubular metal blank from which the blade is formed. Fig. 1ª is an end view of said blank. Fig. 2 is an elevation of the blank, after one end portion has been swaged and reduced in diameter, for the formation of the tubular shank or inner end of the blade. Fig. 2ª is an end view of the swaged blank shown in Fig. 2. Fig. 3 is a longitudinal section of the swaged blank after its shank has been upset to provide an adequate wall thickness for the attachment of the blade to a hub. Fig. 4 is a section of the blank with a circular plug secured in the shank portion and after the wall of the airfoil portion has been operated on to produce a tapered wall thickness. Fig. 5 is a section illustrating the manner of flattening the outer portion of the tubular blank between dies. Fig. 5ª is a section on 5ª—5ª of Fig. 5. Fig. 6 is a plan illustrating the flattened blank and the manner of trimming the edges therefrom to provide sections for the leading and trailing faces of the blade. Fig. 7 is an end elevation illustrating the manner of producing the flat face-sections to receive a reinforcing strip for the leading edge. Fig. 8 is a cross-section through the flattened portion of the blank illustrating the insertion of the reinforcing strip between the face-sections at the leading edge of the blade. Fig. 8ª is a plan illustrating the blank after it has been flattened and the side-sections have been welded together, a portion of one of the said sections being broken away. Fig. 8ᵇ is a side elevation of a portion of the structure shown in Fig. 8 and showing the strip in the leading edge. Fig. 9 is a plan of the dies wherein and whereby the blank will be shaped into airfoil form. Fig. 10 is a section on line 10—10 of Fig. 9, illustrating the deformation of a tubular portion of the blank into airfoil form. Fig. 10ª is a section on line 10ᵇ—10ᵇ of Fig. 9 before the flat side-sections have been expanded to airfoil form. Fig. 10ᵇ is a section on line 10ᵇ—10ᵇ of Fig. 9 after the side-sections have been expanded to airfoil form. Fig. 10ᶜ is a section on line 10ᶜ—10ᶜ of Fig. 9 after the tubular portion of the blank therein at that point has been expanded to airfoil form. Fig. 11 is a plan of the finished blade. Fig. 11ª is a section on line 11ª—11ª of Fig. 11.

The invention is exemplified in a method of producing a propeller-blade from a seamless hollow tube a, as shown in Figs. 1 and 1ª, with a cylindrical wall of uniform thickness and cut, of the proper length for making the blade. The preferred metal is steel. The scale, pits, die marks, and other irregularities, will first be removed from the inner periphery of the tube, for example, by a honing machine, so that said inner surface will be uniform in dimension and free from imperfections.

Next, the tubular blank will be reduced in diameter by swaging to form a cylindrical shank portion $b$ at one end thereof and an intermediate portion $b'$ of gradually increasing diameter extending from said shank portion to approximately mid-length of the blank, as shown in Fig. 2. The outer end portion $b^2$ of the blank is left with its original diameter. This blank then has a variation in diameter which greatly facilitates its formation into a finished blade.

Next, the end portion $b$ of the blank is upset in axial direction to provide adequate wall-thickness for attachment of the shank to the hub, substantially as shown at $c$ in Fig. 3, if the swaging does not produce sufficient wall-thickness in the shank for that purpose. When it is desirable to reinforce the root or shank of the blade or to provide a pilot for anti-friction bearing as used in controllable propellers, the socket in the inner end of the blade is machined and a reinforcing plug or sleeve $d$ is inserted, as illustrated in Fig. 4, and securely attached to the blank by a bond such as results from brazing with copper in the presence of hydrogen.

The tubular blank is operated upon or machined to produce a taper in the wall-thickness from the shank portion to the tip, as shown at $e$ in Fig. 4. This will attain the desired variation in centrifugal stress along the radius of the airfoil portion of the finished blade.

Next, the blank is heated to a point just below recalescence temperature and placed, as shown in Fig. 5, between a pair of dies $f$, which are adapted to flatten the outer end portion $b^2$ of the tubular blank substantially from a point mid-length of the blank to its outer end. The forming faces of these dies are gradually flared, as shown at $g$ for a gradual reduction of the intermediate tubular portion $b'$ of the blank to the point where the blank is flattened. The portions $f'$ of the dies are adapted to fold the tubular wall portion between them upon itself, so that the outer portion of the blank will be flat with two substantially parallel face-portions, as shown in Fig. 5ª. This flattening, while the blank is just below recalescence temperature, avoids the possibility of cracking of the metal at the folds and also prevents hardening by heat transference to the flattening dies, which would retard or render difficult the subsequent trimming operation. This flattening operation is performed so that the edges of the flattened portion of the blank can be conveniently trimmed by a band-saw or similar machine to form face-sections for the blade for subsequent airfoil formation.

When removed from the dies $f$, the blank will be of the contour shown in Fig. 6. The edges of both of the folds of the flattened portion of the blank are then trimmed therefrom, usually by a band-saw, on the line $h$ in Fig. 6. This severs the folded edges and the portion $h$ from the flattened portion of the blank and produces a bifurcated portion forming two sections $b'$ which are adapted to be shaped to form the leading and trailing sides of the blade. The cut at line $h$ is made to conform substantially to the desired contour of the leading and trailing edges of the blade. These sections will be integral with the tubular shank portion $b$ and the intermediate tubular portion $b'$.

Next, the edges of the sections $h'$ at one side will be spread apart, as shown at $l$ in Fig. 7, and a flat strip $m$ will be inserted in the gap, as illustrated in Fig. 8. This strip of metal is curved to conform to the leading edge of the sections $h'$ from the tip to the tubular portion $b'$; tapers in thickness longitudinally as shown in Fig. 8ᵇ; and is of sufficient width to provide ample weld area for joining said sections together. After the strip $m$ has been inserted, the meeting faces of the sections $h'$ are welded together along the trailing edge, as indicated at $n$, and the faces of the strip $m$ are welded to the contiguous inner faces of the sections $h'$ along the leading edge so that the margins of said sections will be continuously and securely joined at the leading and trailing edges and the tip of the blade, to the points where the blank has been left tubular. This strip of metal for the leading edge also places the weld line in oblique relation to the finished wall-thickness, thus providing a more efficient attachment than that provided by a butt weld at the leading edge, the area of which would correspond to the sheet thickness.

Next, the blank, with its sections $h'$ thus welded is placed between shaping dies $o, o'$. The cavities in the dies correspond substantially to the airfoil section of the finished blade.

The mating halves of the dies are shaped so that the tubular portion between the shank portion and the flat face-sections will be deformed into the desired airfoil section $b^4$, $b^5$, when the dies $o, o'$ are brought together, as shown in Figs. 10, 10ᶜ. During this deforming operation the sections $h'$ will be loosely enclosed.

At this stage, the sections of the blade formed by the tubular portions $b, b'$, are circular in cross-section and the flat sections $h'$, with their margins joined together directly at one side and through the strip $m$ at the other, form a structure which is triangular in cross-section. The mating cavities in dies $o, o'$ are shaped so that the tubular portion $b'$ between the shank portion $b$ and the flat portions $f, f'$ will be deformed into the desired airfoil sections, as illustrated at $b^4$ and $b^5$ in Figs. 10 and 10ᶜ, when the dies are brought together.

Gaps $o^2$ are provided in the die-cavity to receive and enclose the margins of the triangular structure formed by sections $h'$ and strip $m$. When the dies have been brought together, the portion between the shank and the flat sections $h'$ will be shaped to airfoil form. The margins of the sections $h'$ will then be gripped by the walls of the cavities $o^2$ in the dies.

When the blank is made of steel, it will be heated above the recalescence temperature before the dies $o, o'$ are brought together. A two-way cock $q$, with a branch $q'$ leading from a supply of gaseous fluid under pressure of, say, 300 pounds, and with a branch $q^2$ leading from a supply of fluid, such as quenching oil under pressure, is temporarily connected to the plug $d$ in the shank portion of the blank.

Next, the cock $q$ will be opened to admit gaseous pressure into the hot blank to inflate it and cause the sections $h'$ to conform with the dies until its walls are in contact with the wall of the die cavity and have the desired airfoil shape without appreciably cooling the blank.

Next, the cock $q$ will be manipulated to cut off the supply of gaseous pressure and to deliver a spray of quenching oil or other fluid over the inner surfaces of the blade at a controlled rate and controlled pressure, so that the blade will be cooled at a rate greater than the critical cooling rate of the metal and will, therefore, be hardened. During the cooling of the blank, the dies may be opened sufficiently to position the welded edges of the blank loosely so that the sections of the blade are not restrained from shrinking in width as they cool.

Next, the outer surfaces of the blades are finished. The leading edge is finished to the desired contour, as shown in Fig. 11ª, and the trailing edge may also be finished for the same purpose. After the blade has been thus manufactured, it is tempered, or otherwise treated, to obtain the desired physical properties of the metal.

The invention exemplifies a method of producing a hollow metal propeller-blade for aircraft, preferably of steel, in which the blade is made from a section of tubing which is flattened and trimmed for the formation of the camber and face-sections of the blade and the inner shank and intermediate portion are left circular, so that welding is necessary only for the flattened and trimmed sections. It also exemplifies a method of producing hollow steel propellers at a low cost. It also exemplifies a blade in which a flattened trimmed portion of the tubular blank is united at its leading edge by welds of great area and which places the weld line in an oblique relation to the finished wall contour in thickness and in which the leading edge is reinforced against impact and abrasion to which the blade is subjected when in use. It also minimizes stresses at the leading edge, which is desired, so that any nicks produced in service will not be serious. It also exemplifies a propeller-blade which embodies the advantageous characteristics and attributes of the foregoing method of production.

As a result of flattening the blank so it will be composed of substantially parallel face-portions, their inner faces will be parallel with ample weld area for welding by means of cylindrical rolls, and the bends between the face-sections can be trimmed off by a simple band-saw operation without the necessity of providing expensive jigs or tools for holding the blank during sawing.

The invention is not to be understood as restricted to the details set forth, since these may be modified within the scope of the appended claims, without departing from the spirit and scope of the invention.

Having thus described the invention, what I claim as new and desire to secure by Letters Patent is:

1. That improvement in the manufacture of hollow metal propeller-blades from a seamless tubular blank, which consists in flattening upon itself the tubular blank from approximately mid-length to one end, trimming the flattened portion to form leading and trailing edges of the blade, joining together the margins of the face-sections and expanding the walls by internal pressure, to airfoil form, while heated above recalescence temperature.

2. The method of producing a hollow metal propeller-blade from a single tubular blank, which consists in flattening the outer portion of the tubular blank upon itself, trimming the edges of the flattened portion of the blank from the outer end to approximately mid-length of the blank to form the plan-form for sections integral with the tubular portion of the blank, joining together the margins of the sections along the leading and trailing edges, and expanding the joined sections into airfoil form.

3. The method of producing a hollow metal propeller-blade from a single tubular blank, which consists in flattening the outer portion of the tubular blank upon itself while heated below recalescence temperature, trimming the edges of the flattened portion of the blank from its outer end to approximately mid-length of the blank to form the plan-form for sections integral with the tubular portion of the blank, joining together the margins of the sections along the leading and trailing edges, and expanding the joined sections into airfoil form.

4. The method of producing a hollow metal propeller-blade from a single tubular blank which varies in wall-thickness and diameter, which consists in flattening the outer portion of the tubular blank upon itself, trimming the edges of the flattened portion of the blank from its outer end to approximately mid-length of the blank to form outer sections integral with the tubular portion of the blank, and along lines conformably to the leading and trailing edges of the blade, joining together the margins of the sections along the leading and trailing edges, and expanding the joined sections into airfoil form.

5. The method of producing a hollow metal propeller-blade from a single tubular blank, which consists in flattening the outer portion of the tubular blank upon itself, trimming the edges of the flattened portion of the blank from its outer end to approximately mid-length of the blank to form sections integral with the tubular portion of the blank, and along lines conformably to the leading and trailing edges of the blade, joining together the margins of the sections along the leading and trailing edges, and expanding, by internal fluid pressure, the joined sections into airfoil form while heated above recalescence temperature.

6. The method of producing a hollow metal propeller-blade from a tubular blank, which consists in flattening the outer portion of the tubular blank upon itself, trimming the edges of the flattened portion of the blank to bifurcate the blank for sections integral with its tubular portion approximately from mid-length of the blade, to the end of the flattened portion and along lines conformably to the leading and trailing edges of the blade, inserting a strip of metal between the face-sections along the leading edge, joining the strip with the contiguous inner faces of the sections and joining the sections along the trailing edge and expanding the joined sections to airfoil shape.

7. The method of producing a hollow metal propeller-blade from a tubular blank, which consists in flattening the outer portion of the tubular blank upon itself, trimming the edges of the flattened portion of the blank to bifurcate the blank and form sections integral with its tubular portion approximately from mid-length of the blade, to the end of the flattened portion and along lines conformably to the leading and trailing edges of the blade, inserting a strip of metal between the sections along the leading edge, the strip being tapered longitudinally joining the strip with the contiguous inner faces of the sections and joining the face-sections along the trailing edge and expanding the joined sections to airfoil shape.

8. The method of producing a hollow metal propeller blade from a tubular blank, which consists in flattening the outer portion of the tubular blank upon itself, trimming the edges of the flattened portion of the blank for sections integral with the tubular portion of the blank approximately from mid-length of the blade, to the end of the flattened portion and along lines conformably to the leading and trailing edges of the blade, inserting a strip of metal between the sections along the leading edge, joining the strip with the contiguous inner faces of the sections and joining the sections along the trailing edge and expanding the joined sections to airfoil shape while heated above recalescence temperature.

9. The method of producing a hollow metal propeller-blade from a tubular blank, in which one end portion of the blank has an increased wall thickness and the remainder has a wall of tapered thickness, which consists in flattening the outer portion of the tubular blank upon itself, trimming the edges of the flattened portion of the blank for outer-sections integral with the tubular portion of the blank approximately from mid-length of the blade to the end of the flattened portion and along lines conformably to the leading and trailing edges of the blade, inserting a strip of metal between the sections along the leading edge, joining the strip with the contiguous inner faces of the sections and joining the sections along the trailing edge of the sections, and expanding to air foil shape, the joined sections.

10. The method of producing a hollow metal propeller-blade from a seamless tubular blank, which consists in flattening the outer portion of the tubular blank so as to form substantially parallel face-sections, trimming the edges of the flattened portion of the blank for the plan-form of sections integral with the tubular portion of the blank, joining together the margins of the sections along the leading and trailing edges, deforming into airfoil form the tubular portion of the blank inwardly of the trimmed portion, and expanding the sections into airfoil form.

11. The method of producing a hollow metal propeller-blade from a seamless tubular blank having a wall thickness tapering from its inner to its outer end, which consists in flattening the outer portion of the tubular blank so as to form substantially parallel face-sections, trimming the edges of the flattened portion of the blank for sections integral with the tubular portion of the blank, along lines conformally to the leading and trailing edges of the blade, joining the margins of the sections along their edges, deforming into an airfoil form, by external dies, the tubular portion of the blank inwardly of the trimmed portion, and expanding the sections into airfoil form.

12. The method of producing a hollow metal propeller-blade from a seamless tubular blank which comprises, flattening the outer portion of the tubular blank so as to form face-sections having substantially parallel inner faces along both of their edges, trimming the edges of the flattened portion of the tubular blank for forming sections integral with the tubular portion of the blank, joining together the margins of the sections along the leading and trailing edges of the blade, deforming into airfoil form by external dies the tubular portion of the blank inwardly of the trimmed portion while heated above recalescence temperature and expanding the sections into airfoil form.

13. That improvement in the manufacture of a hollow steel propeller blade for aircraft which comprises forming a tubular blank into a hollow shank and integral suction and pressure face members, cutting the blank along one margin of the face members, the members having along the cut margin a combined wall-thickness for the formation of an airfoil edge, shaping the face members with substantially parallel contiguous inner face portions along said margin, directly welding together said substantially parallel contiguous inner face portions and shaping the joined portions to form an airfoil edge on the blade.

14. That improvement in the manufacture of hollow steel blades for aircraft which comprises forming a tubular blank into a hollow shank, and integral suction and pressure face members with substantially parallel inner face portions along one of their margins, welding between said substantially parallel inner face portions a strip having faces substantially parallel to said substantially parallel inner face portions on the members, and shaping said joined strip and marginal portions of the face members to form an airfoil edge on the blade.

GLEN T. LAMPTON.